US008512614B2

(12) United States Patent
Diefenderfer et al.

(10) Patent No.: US 8,512,614 B2
(45) Date of Patent: Aug. 20, 2013

(54) MODULAR MOLDING SYSTEM

(75) Inventors: Randall R. Diefenderfer, Rogersville, MO (US); Randy C. Foster, Strafford, MO (US); Enayat O. Karimian, Springfield, MO (US)

(73) Assignee: Dayco IP Holdings, LLC, Springfield, MO (US)

( * ) Notice: Subject to any disclaimer, the term of this patent is extended or adjusted under 35 U.S.C. 154(b) by 62 days.

(21) Appl. No.: 13/164,377

(22) Filed: Jun. 20, 2011

(65) Prior Publication Data

US 2012/0319324 A1 Dec. 20, 2012

(51) Int. Cl.
*B29C 33/00* (2006.01)
(52) U.S. Cl.
USPC ............. 264/219; 264/319; 425/47; 425/365; 249/57; 249/187.1; 29/895.2; 29/895.23; 29/895.31
(58) Field of Classification Search
None
See application file for complete search history.

(56) References Cited

U.S. PATENT DOCUMENTS

| 2,773,540 | A | 12/1956 | Waugh |
| 3,032,288 | A | 5/1962 | Tidland |
| 3,486,626 | A | 12/1969 | Close |
| 3,738,187 | A * | 6/1973 | Hisserich ...................... 474/148 |
| 4,371,363 | A * | 2/1983 | Cicognani et al. ............ 474/205 |
| 4,754,543 | A | 7/1988 | Spivy |
| 4,838,843 | A * | 6/1989 | Westhoff ....................... 474/205 |
| 5,266,137 | A | 11/1993 | Hollingsworth |
| 5,292,474 | A | 3/1994 | Thomas |
| 5,350,139 | A | 9/1994 | Leyderman |
| 5,888,330 | A | 3/1999 | Onaka et al. |
| 6,716,012 | B2 | 4/2004 | Yovichin et al. |
| 6,896,634 | B2 * | 5/2005 | Winninger et al. ........... 474/260 |
| 6,949,211 | B2 * | 9/2005 | Lederer et al. ................ 264/219 |
| 7,135,082 | B2 * | 11/2006 | Hara et al. ..................... 156/138 |
| 7,144,345 | B2 * | 12/2006 | Edamatsu et al. ............ 474/205 |
| 7,189,069 | B2 | 3/2007 | Yovichin et al. |
| 7,704,067 | B2 | 4/2010 | Adams et al. |
| 8,002,922 | B2 * | 8/2011 | Onita et al. ................... 156/140 |
| 2007/0023127 | A1 | 2/2007 | Onita et al. |
| 2007/0244263 | A1 * | 10/2007 | Burrowes ................... 525/326.1 |
| 2010/0279808 | A1 * | 11/2010 | Fan et al. ...................... 474/205 |

OTHER PUBLICATIONS

PCT, International Search Report and Written Opinion, International Application No. PCT/US2012/043048 (Aug. 24, 2012).

* cited by examiner

*Primary Examiner* — Mary F Theisen
(74) *Attorney, Agent, or Firm* — Thompson Hine, L.L.P.

(57) ABSTRACT

A molding system including a component formed in a generally closed loop shape and having a plurality of radially extending teeth. The component includes a plurality of discrete segments coupled together.

31 Claims, 8 Drawing Sheets

MODULAR MOLDING SYSTEM

The present invention is directed to a molding system, and more particularly, to a modular molding component having a plurality of interlocked segments.

BACKGROUND

In existing drive belt manufacturing operations, the belts and related components can be manufactured by pressing a material against outer and/or inner molding surface to form grooves and teeth on the belt material. Some existing belt molding surfaces are made of a rubber matrix or other similar material, which may be relatively inexpensive and easy to manufacture. However, such rubber molding surfaces typically provide less consistent shapes and inferior finishes to the drive belt or other components compared to metal-surfaced molding components, and may also lack durability, often lasting only a few production cycles. On the other hand, belt molding components made of metal or other rigid materials are often expensive to manufacture and difficult to repair.

SUMMARY

Accordingly, in one embodiment, the present invention is a modular molding surface which can, in one embodiment, be made of a suitable metal or other relatively rigid material to provide superior drive belt formation. In addition, the modular nature of the system results in a molding surface which is relatively easy and inexpensive to assemble and repair. More particularly, in one embodiment the invention is a molding system including a component formed in a generally closed loop shape and having a plurality of radially extending teeth. The component includes a plurality of discrete segments coupled together.

DETAILED DESCRIPTION

Figure 7:
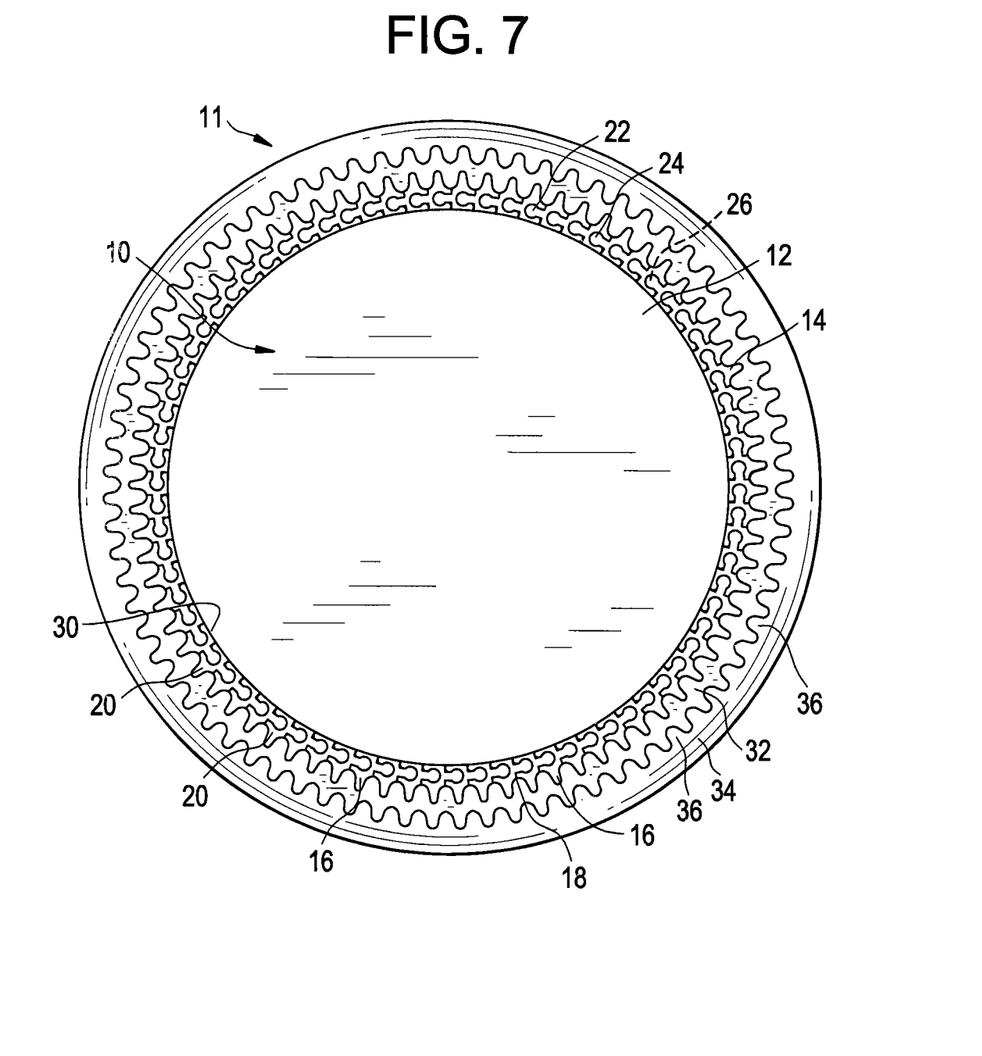
FIG. 7 is an end view of the mandrel of FIG. 6, shown in conjunction with a curing sleeve with a belt positioned therebetween.

As shown in FIG. 7, in one embodiment the present invention takes the form of a molding system 11 in which a generally cylindrical belt 32, with inner and outer grooves thereon, is formed or molded. The belt 32 is positioned between a mandrel system or molding component 10, which forms the inner grooves of the belt 32, and a curing sleeve or jacket 34, which forms the outer grooves on the belt 32. The mandrel system 10 includes a generally cylindrical mandrel body 12, and a general cylindrical mandrel surface or component 14 formed in a generally closed looped shape and extending circumferentially around the mandrel body 12. The mandrel surface 14 has a plurality of radially-outwardly extending protrusions/teeth 16, and a radially-inwardly extending recesses 18 positioned between each tooth 16.

The mandrel surface 14 includes a plurality of mandrel segments 20 releasably interlocked together. In particular, in the embodiment shown in FIGS. 1 and 2, each mandrel segment 20 includes a locking portion 22 configured to releasably interlock to an adjacent mandrel segment 20. In the particular illustrated embodiment, each mandrel segment 20 has a male portion 24 and a corresponding opening or female portion 26, each shaped as generally circular or bulbous portions. Each male portion 24 of each mandrel segment 20 is receivable in a female portion 26 of the adjacent mandrel 20 segment to interlock the adjacent mandrel 20 segments together. The circular shape of the male 24 and female 26 portions allow the associated mandrel segments 20 to shift/pivot relative to each other, although the male 24 and female 26 portions can take any of a wide variety of other shapes and configurations besides circular.

In order to form the mandrel surface 14 from the mandrel segments 20, each male portion 24 is slid into a female portion 26 of an adjacent mandrel segment 20 in the axial direction until the mandrel segments 20 are generally axially aligned. Additional mandrel segments 20 are then mounted in the axial direction until a generally closed loop shape is formed, as shown in FIG. 1.

The mandrel surface 14 has a generally circular shape in end view, and each locking portion 22 (male portion 24/female portion 26) is positioned at or adjacent to a circumferential end surface thereof. This positioning ensures that the locking portions 22 do not interfere with the belt molding process, or attachment of the mandrel surface 14 to the mandrel body 12, as will be described in greater detail below.

Figure 1:
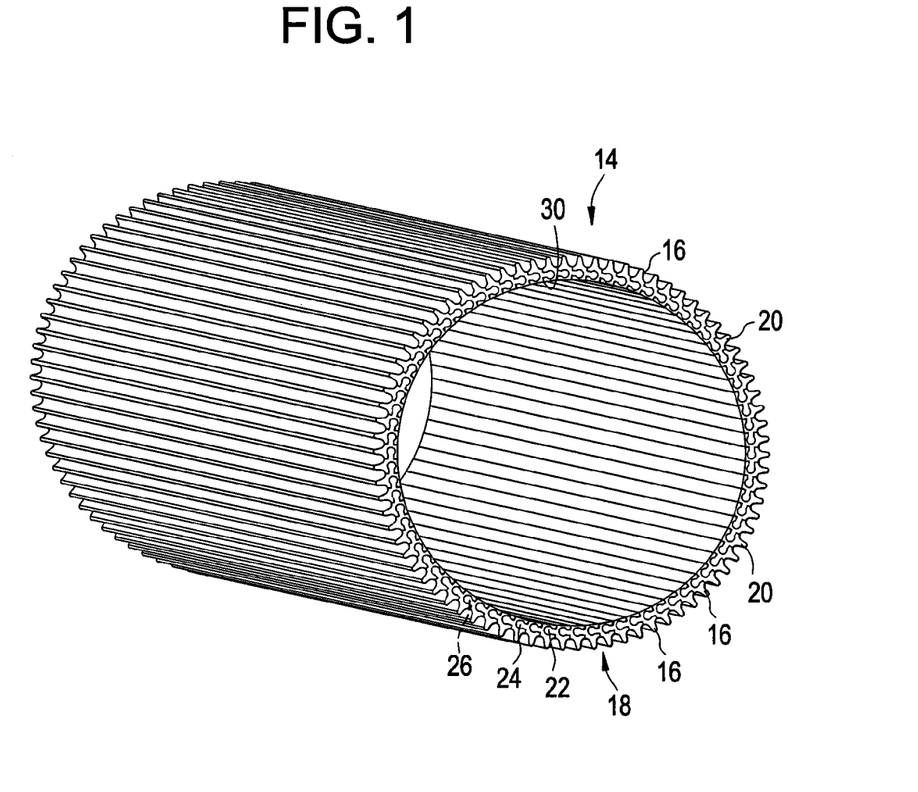
FIG. 1 is a front perspective view of one embodiment of a mandrel surface of the present invention.
Figure 2:
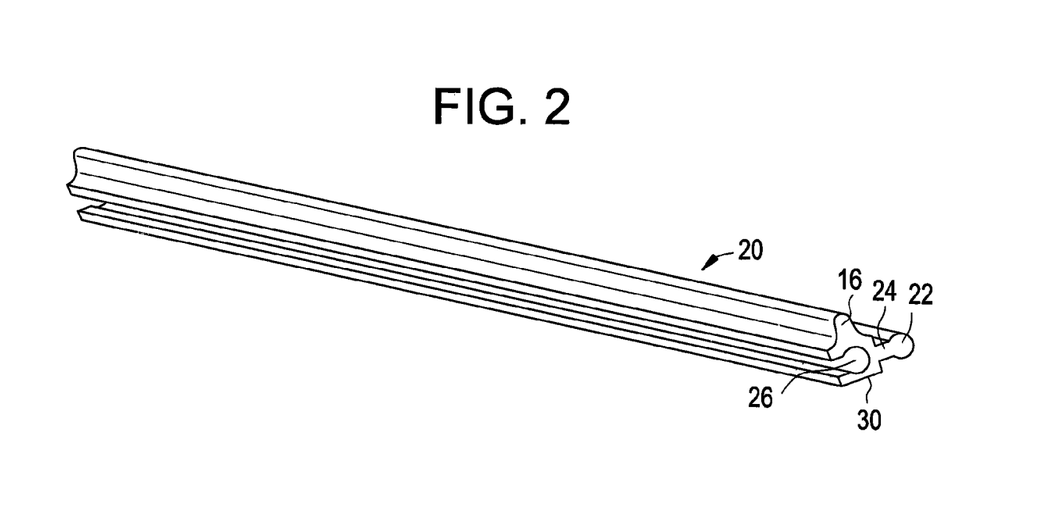
FIG. 2 is a front perspective view of a mandrel segment of the mandrel surface of FIG. 1.
Figure 3:
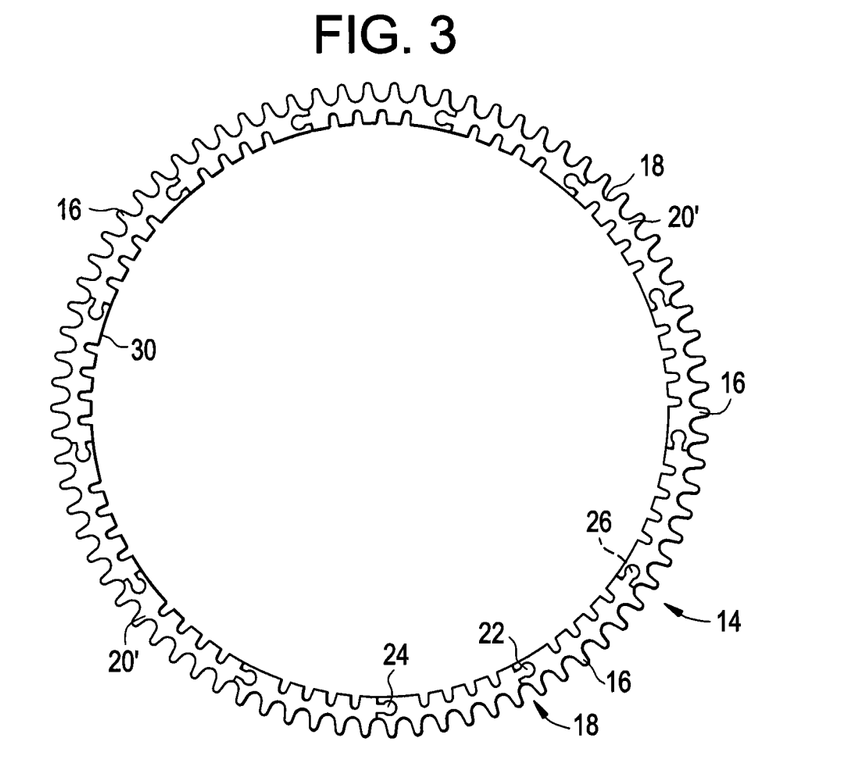
FIG. 3 is an end view of an alternate mandrel surface.
Figure 4:
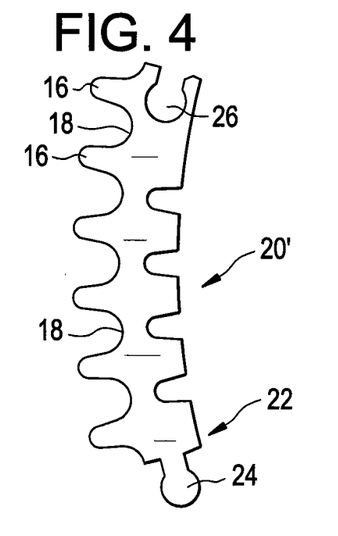
FIG. 4 is an end view of a mandrel segment of the mandrel surface of FIG. 3.

In the embodiments shown in FIGS. 1 and 2, each mandrel segment 20 has a relatively short circumferential length and includes a single radially outwardly-extending tooth 16. However, each mandrel segment 20 can include various other numbers of teeth 16 thereon. For example, in the embodiment shown in FIGS. 3 and 4, each mandrel segment 20' has a longer circumferential length as compared to the embodiments of FIGS. 1 and 2 and includes six teeth 16 carried thereon. However, it should be understood that each mandrel segment 20, 20' can include any of a variety of number of teeth 16 carried thereon. Moreover, in certain cases some mandrel segments 20 may be relatively short and may lack any teeth carried thereon. Such mandrel segments may act as a spacer or connector to connect teeth-bearing mandrel segments.

Figure 5:
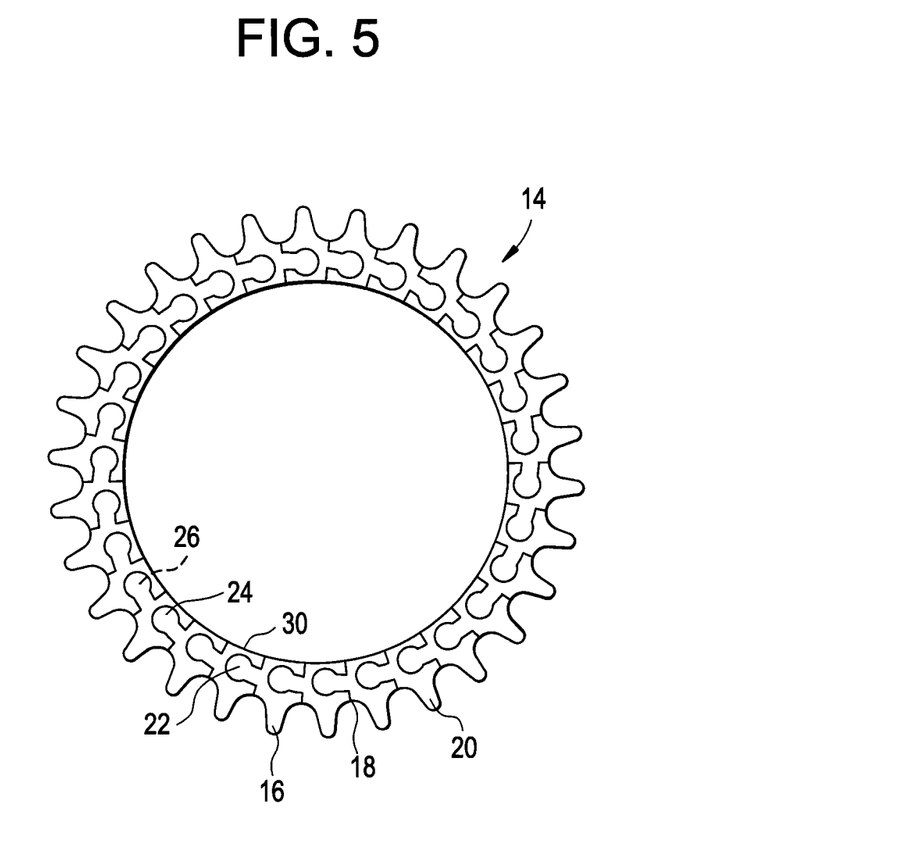
FIG. 5 is an end view of an alternate mandrel surface formed using the mandrel segment of FIG. 2.

As can be seen, FIG. 1 illustrates a mandrel surface 14 made up of a relatively large number of mandrel segments 20 of FIG. 2. However, the number of mandrel segments 20 in a particular mandrel surface 14 can be varied as desired. For example, FIG. 5 illustrates an alternate embodiment in which a smaller number of mandrel segments 20 are utilized to form a mandrel surface 14 with a smaller radius compared to the mandrel surface 14 of FIG. 1. Thus, it can be seen that the modular nature of the mandrel segment 20 enables mandrel surfaces 14 of any of a wide variety of sizes to be assembled, having a radius ranging, in one case, from between about one inch to about six inches or more. The mandrel surface 14 may have a lower limit for its radius, given the fact that the radially inner edge 30 of the mandrel segments 20 may bind and interfere with each other. However, there is no impediment to adding additional mandrel segments 20 to form a larger mandrel surface 14, and in theory a mandrel surface 14 with as large a radius as desired can be formed. Thus, the mandrel surface 14 can be changed in diameter simply by adding/removing mandrel segments 20 as desired. In some cases, however, the mandrel surface 14 may be permanently formed by coupling the mandrel segments 20 together, such as by welding, attachment brackets, or by other metallurgical, mechanical, or other attachment methods.

The radially inner edge 30 of each mandrel segment 20, in one embodiment, has a radius of curvature. In some cases, then, the mandrel surface 14 may have an effective inner radius that is the same as the radius of curvature of the inner edges 30 such that each inner edge 30 smoothly transitions to an adjacent inner edge 30. However, as should be clear from the discussion above, the mandrel surface 14 can have an effective inner radius that differs from the radius of curvature of the associated mandrel segments 20 such that the inner edges 30 form more of a polygon shape.

In the illustrated embodiments, each mandrel surface 14 is made of a plurality of mandrel segments 20 that are substantially identical in size and shape. However, if desired, differing sizes and/or shapes of mandrel segments 20, including mixing and matching the mandrel segments 20, 20' shown in FIGS. 2 and 4, or others, can be utilized to form a mandrel surface 14.

As can be seen, each mandrel segment 20 can be made of an extruded piece of material such as metal, more particularly aluminum, aluminum alloys or the like, or other suitably hard and durable material. In addition, when the mandrel surface 14 is assembled, the mandrel surface 14 may be generally cylindrical and have an axial length that is at least about as long as the radius of the cylinder, or at least about one quarter of the radius of the cylinder, to provide a relatively elongated cylinder appropriate for forming conventional drive belts.

Figure 6:
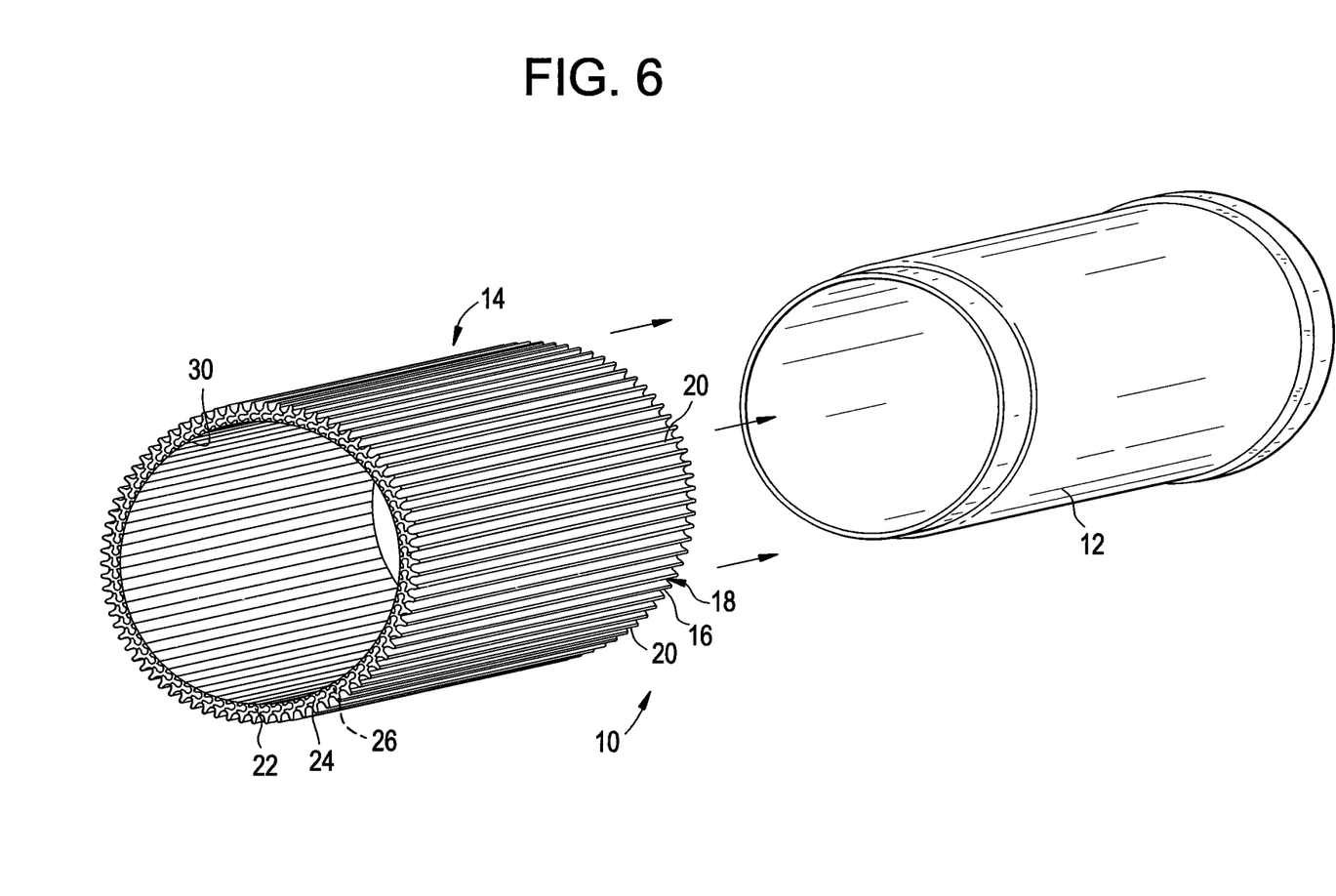
FIG. 6 is a front perspective view of the mandrel surface of FIG. 1, shown being mounted on a mandrel body.

After the mandrel surface 14 of the desired shape and characteristics is formed, the mandrel surface 14 may be coupled to the mandrel body 12, as shown in FIG. 6. The mandrel surface 14 can be coupled to the mandrel body 12 by any of a wide variety of mechanisms or means, such as welding, adhesives, mechanical attachments, the use of locking rings, retaining rings, interlocking attachments, etc. The mandrel body 12 is generally cylindrical in the illustrated embodiment, and closely receives the mandrel surface 14 thereon such that the radially inner surface of the mandrel surface 14 is closely received over, and supported by, the mandrel body 12. In the illustrated embodiment, the mandrel body 12 is shown as a single monolithic material for illustrative purposes, but the mandrel body 12 may include various built-up layers of material, such as rubber and/or metal, etc.

Once assembled, the mandrel system 10 can be used to form drive belts. In particular, the belt can be formed by placing a material 32, such as rubber, rubber plies, built-up rubber plies or the like, about the mandrel surface 14 (FIG. 7). A curing sleeve 34, such as a suitable sleeve, jacket or the like, is then placed around the material 32 in a coaxial arrangement with the mandrel system 10, defining a gap therebetween in which the material 32 is positioned. In the illustrated embodiment, the sleeve 34 includes a plurality of radially inwardly-extending teeth 36 carried thereabout. The curing sleeve 34 is then placed under external pressure (or other suitable force), thereby driving the teeth 36 of the sleeve 34 into the material 32, and also driving the material 32 against the teeth 16, and into the grooves 18, of the mandrel surface 14. Heat and/or further pressure may be applied to form the material into the desired shape of the cylindrical belt 32.

Once sufficient heat and pressure have been applied and the belt 32 is formed into the desired shape, the curing sleeve 34 is removed and the belt 32 is slid axially off of the mandrel surface 14. The resultant drive belt 32 may be generally cylindrical, and have a set of radially inner teeth/grooves formed by the mandrel surface 14, and a set of radially outer teeth/grooves formed by the curing sleeve 32. However, is should be noted that although the description and illustrations provided herein illustrate a belt 32 with an externally-grooved surface, the belt 32 may only have inner grooves and have a smooth outer surface, or only have outer grooves and have a smooth inner surface, or have shapes other than that shown herein.

As shown in FIGS. 8A, 8B, 8C and 9, the mandrel surface 14 described and shown above, or one similar to it, may be used to form the curing jacket or sleeve 34, or a curing sleeve mold 46. In the embodiment shown in FIGS. 8A-8C, the a plate/molding system 38 is provided and made up of a plurality of segments 20 (and/or segments 20') in a similar manner to the mandrel system 10 described above. In particular, each segment 20 can have a locking portion 22/male portion 24/female portion 26, and be coupled/decoupled in the same or similar manner as the mandrel segments described above.

Figure 8A:
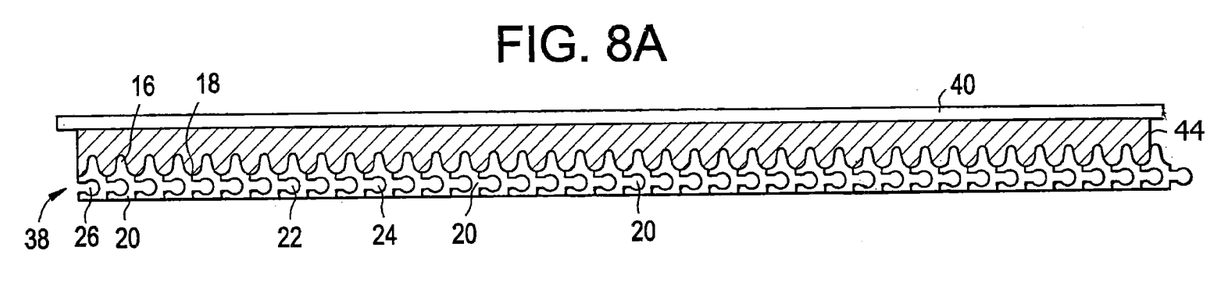
FIGS. 8A-8C illustrate a series of steps which may be utilized to form the curing sleeve of FIG. 7.
Figure 8B:
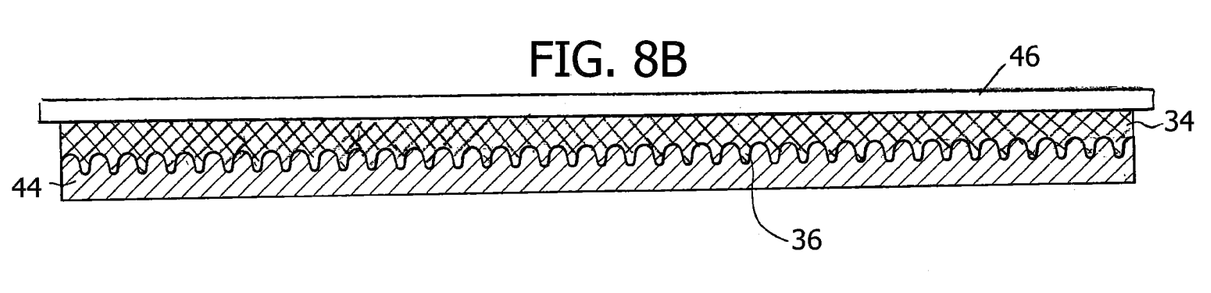
Figure 8C:
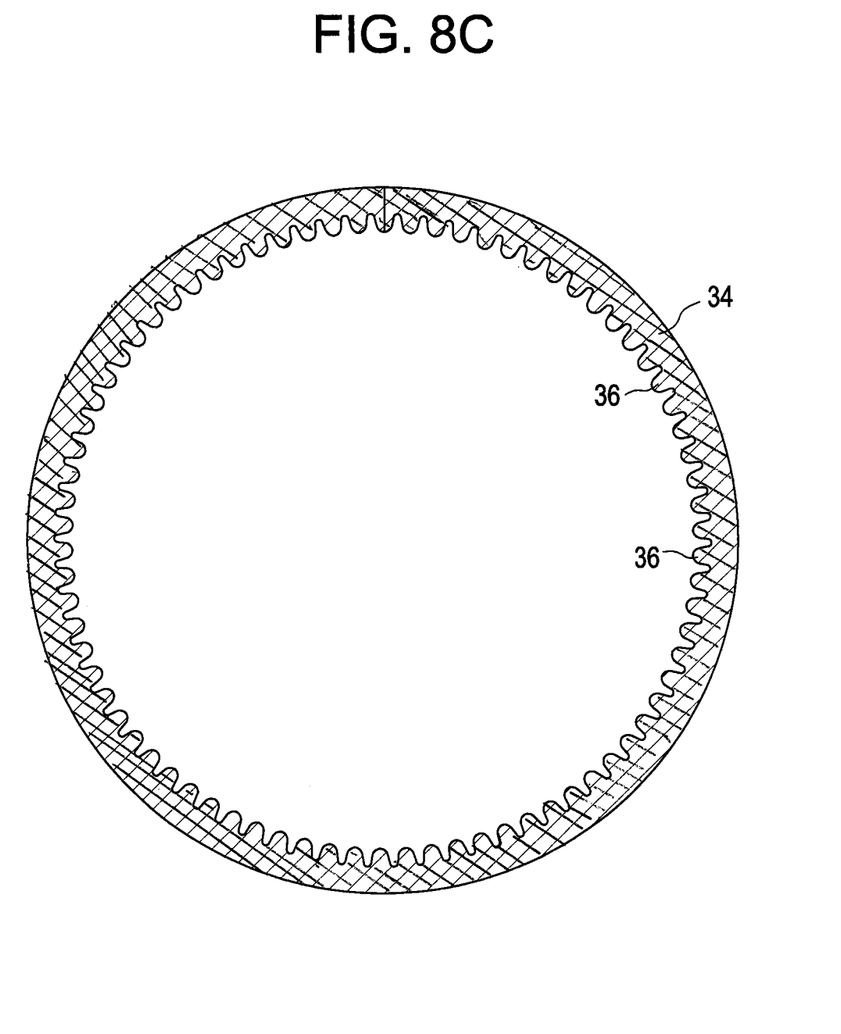

The plate 38 can be used to form a sleeve mold 44, which is in turn used to form the sleeve 34. In order to form the sleeve mold 44, a material used to form the sleeve mold 44, such as a very heavy gauge rubber with no cords or fabric, is then placed on the plate 38 and pressed into contact with the plate 38, such as by a press plate 40. The sleeve mold 44 is then removed from the plates 38, 40. The material used to form the sleeve 34 is then placed onto the sleeve mold 44 and pressed into contact with the sleeve mold 44, such as by a press plate 46 (FIG. 8B). The molded sleeve material 34 is then removed and formed into a closed loop shape, as shown in FIG. 8C to form the sleeve 34. The sleeve 34 can then be used to form the outer grooves in the belt 32, as shown in FIG. 7.

Figure 9:
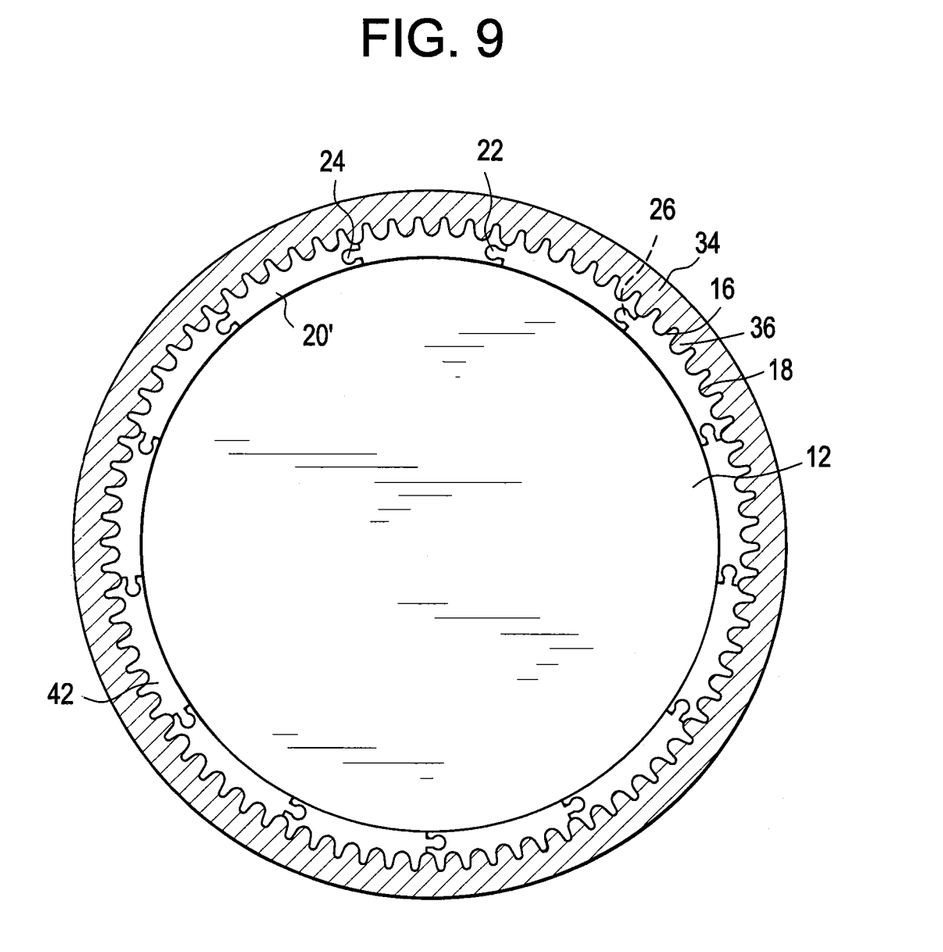
FIG. 9 illustrates an alternate method for forming the curing sleeve of FIG. 7.

As shown in FIG. 9, in an alternate embodiment the sleeve 34 is formed by a mandrel system/molding component 42. In this case the sleeve 34 is formed in a cylindrical shape about the mandrel system 42 in a manner similar to the system shown in FIG. 7 for forming the belt 32, and described in the accompanying description, except that the outer surface of the sleeve 34 may be formed without lack any grooves/teeth formed therein. The sleeve 34 shown in FIG. 9 can then be removed from the mandrel 42 and used to form the outer grooves in the belt 32, as shown in FIG. 7.

The molding component 24 shown in FIG. 9 is made up of the segments 20' each having multiple teeth 16, but the molding component can also be made of segments 20 with only a single tooth carried thereon, or combinations thereof. Similarly, the molding component 38 shown in FIG. 8A can be made of various types of segments 20, 20'. The molding components shown herein have teeth 16 extending radially outwardly; however, it should be understood that a molding component with teeth 16 extending radially inwardly may also be created and utilized if desired.

Thus, it can be seen that the molding components 14/38/42 disclosed herein can be easily manufactured and assembled. The modular shape enables the molding component 14/38/42 to be made from a plurality of segments 20, 20' etc., each of which can be extruded shape with a relatively small cross section, which are thereby relatively easy to manufacture. The modular nature of the molding component 14/38/42 also enables the molding components to be quickly and easily assembled in a wide variety of shapes. The system also enables easy repair and/or replacement of the segments 20, given that a segment 20 can be easily slid out of place for access and/or replacement. Finally, the system disclosed herein enables the molding components to be formed from metal, which provides better molding results.

Having described the invention in detail and by reference to certain embodiments, it will be apparent that modifications and variations thereof are possible without departing from the scope of the invention.

What is claimed is:

1. A molding system comprising:
   a component formed in a generally closed loop shape and having a plurality of radially extending teeth, wherein said component includes a plurality of discrete segments coupled together.

2. The molding system of claim 1 wherein each segment is releasably interlocked with an adjacent segment.

3. The molding system of claim 1 wherein each segment is permanently coupled to an adjacent segment.

4. The system of claim 1 wherein said component is generally cylindrical.

5. The system of claim 4 wherein said component has an axial length that is at least about ¼ of its radius.

6. The system of claim 1 wherein each tooth extends generally radially outwardly.

7. The system of claim 1 further comprising a central body, wherein said component extends circumferentially around said body and is coupled thereto.

8. The system of claim 1 wherein each segment includes at least one tooth.

9. The system of claim 1 wherein each segment includes only one tooth.

10. The system of claim 1 wherein each segment includes a plurality of teeth.

11. The system of claim 1 wherein each segment has generally the same size and shape.

12. The system of claim 1 wherein each segment has a locking portion, and wherein each locking portion of each segment is coupled to an adjacent segment to interlock said adjacent segments together.

13. The system of claim 12 wherein said component has a generally circular shape in end view, and wherein each locking portion is positioned at or adjacent to a circumferential end surface of an associated segment.

14. The system of claim 1 wherein each segment has a male portion and a female portion, and wherein each male portion of each segment is received in a female portion of an adjacent segment to interlock said adjacent segments together.

15. The system of claim 1 wherein each segment is substantially entirely made of metal.

16. The system of claim 1 wherein each segment has a radially inner edge having a radius of curvature.

17. The system of claim 16 wherein said component is generally cylindrical and has an effective inner radius that is the same as said radius of curvature.

18. The system of claim 16 wherein said component is generally cylindrical and has an effective inner radius that differs from said radius of curvature.

19. The system of claim 1 wherein each segment is made of a separate piece of material relative to the other plurality of segments.

20. The system of claim 1 further including a supplemental component formed in a generally closed loop shape and having plurality of radially extending teeth, wherein said teeth of said supplemental component extend in the opposite direction to said teeth of said component, and wherein said component and supplemental component are generally concentric and define a gap therebetween.

21. The system of claim 1 wherein each component is configured to be releasably interlocked with or removed from an adjacent component by sliding said components generally axially relative to the other.

22. A molding system comprising:
    a molding component having a plurality of discrete segments, each segment having a locking portion, and wherein each locking portion of each segment is coupled to an adjacent segment to interlock said adjacent segments together, and wherein a plurality of said segments include at least one tooth carried thereon.

23. A molding system comprising:
    a plurality of segments, each segment being configured to be slidably interlocked to another segment to form a molding component, wherein a plurality of said segments include at least one tooth carried thereon.

24. The system of claim 23 wherein each segment is configured to be slidably interlocked to another segment to form a molding component in a generally closed loop shape.

25. The system of claim 24 wherein each tooth is positioned to extend generally radially when said segments are interlocked to form said generally closed loop shape.

26. The system of claim 23 wherein each segment is configured to be slidably interlocked to another segment to form a molding component in a generally flat shape.

27. The system of claim 23 wherein each segment is primarily made of metal.

28. A method for assembling a molding system comprising the steps of:
    accessing a plurality of components, at least one of said components having a tooth carried thereon; and
    interlocking a plurality of segments together to form a component having a closed shape with a plurality of radially extending teeth.

29. A method for forming a belt comprising the steps of:
    accessing a molding system having a component formed in a generally closed loop shape and having a plurality of radially extending teeth, wherein said component includes a plurality of segments, each segment being releasably interlocked with an adjacent segment;
    placing a material adjacent to said component; and
    urging said material against said teeth of said component such that said teeth form a plurality of grooves in said material to form said belt.

30. The method of claim 29 wherein the molding system has a supplemental component positioned adjacent to said material and having a plurality of radially extending teeth, and wherein the teeth of one of said component or said supplemental component extend generally radially outwardly and the teeth of the other one of said component or said supplemental component extend generally radially inwardly, and wherein said material is positioned between said component and said supplemental component.

31. The method of claim 30 wherein said supplemental component includes a plurality of segments, each segment being releasably interlocked with an adjacent segment.

* * * * *